No. 794,115. PATENTED JULY 4, 1905.
F. R. PORTER.
COMBINED HOSE RACK AND VALVE.
APPLICATION FILED MAR. 31, 1905.

Witnesses:—
F. George Barry,
Henry Thieme.

Inventor:—
Finley R. Porter
By attorneys
Brown & Seward

No. 794,115. Patented July 4, 1905.

UNITED STATES PATENT OFFICE.

FINLEY R. PORTER, OF EAST STROUDSBURG, PENNSYLVANIA, ASSIGNOR OF ONE-HALF TO WILLIAM A. GILBERT, OF STROUDSBURG, PENNSYLVANIA.

COMBINED HOSE-RACK AND VALVE.

SPECIFICATION forming part of Letters Patent No. 794,115, dated July 4, 1905.

Application filed March 31, 1905. Serial No. 253,025.

*To all whom it may concern:*

Be it known that I, FINLEY R. PORTER, a citizen of the United States, and a resident of East Stroudsburg, in the county of Monroe and State of Pennsylvania, have invented a new and useful Improvement in a Combined Hose-Rack and Valve, of which the following is a specification.

This invention is more especially intended for the hose provided within buildings for connection with the water-supply pipes therein for extinguishing fires; but it may be employed wherever a hose and a valve for supplying water thereto are used.

The invention consists in a hose-rack attached directly to the casing of a valve by a pivotal or other suitable connection entirely independent of the valve-bonnet.

Figure 1:
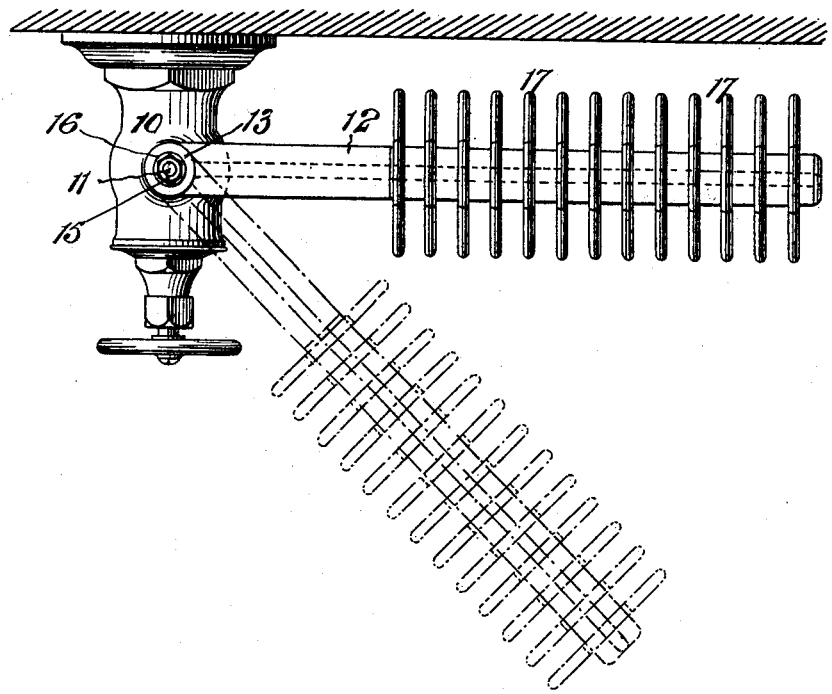
Figure 2:
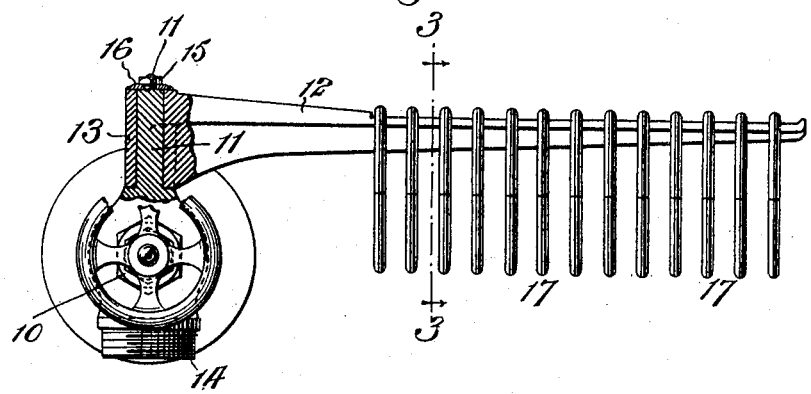
Figure 3:
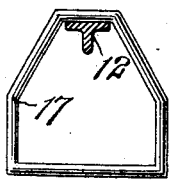

In the accompanying drawings, Figure 1 is a plan view of a hose-rack and valve embodying my invention; Fig. 2, a front view of the same, showing part of the hose-rack and the part of the valve-casing to which it is connected. Fig. 3 is a transverse section of the hose-rack on the line 3 3 of Fig. 2 and a front view of the rings thereon, which receive the coils or folds of the hose.

10 designates the body or casing of the valve, which may be of any suitable pattern and only differs from the casings or bodies of valves heretofore used in that it has cast integrally with it on its upper part independent of the valve-bonnet a standard or projection 11 for the direct attachment of the hose-rack 12, the said standard in the example illustrated being a pivot. The hose-rack 12 is constructed with a socket 13, which is fitted to said pivot to turn freely thereon, so as to allow the rack either to be turned back against or toward the wall or other portion of a building, as shown in full outline in Fig. 1, until it is desired to use the hose or to be turned outward and forward, as shown in dotted outline in the same figure, to permit the rings and hose to be easily removed from the rack when the hose is required to be used and then attached in the usual way by the coupling provided on it to the outlet-nozzle 14 of the valve-casing.

The rack is represented as confined to the pivot 11 by a screw-thread on the end of the pivot and a nut 15 and washer 16 applied thereto. The rings 17, through which the hose is strung and suspended, are applied on the rack in the usual way.

By mounting the hose-rack on a vertical pivot formed integral with the valve-casing independent of the valve-bonnet I am enabled to use a standard type of valve in which the bonnet is located on the side of the valve-casing, so that when the valve is closed no pressure can be exerted from the water-main onto the valve-stem packing in the bonnet and cause leakage at this point. This is a very important feature of my invention.

What I claim as my invention is—

The combination with a valve-casing arranged with its inlet at the side and discharge at the bottom and a horizontally-arranged valve for controlling the water-supply from the inlet to the discharge, of a vertical pivotal projection extended upwardly from the top of the casing and formed integral therewith at a point opposite its discharge, and a hose-rack directly engaged with the pivotal projection and mounted to turn freely thereon in a horizontal plane.

In testimony that I claim the foregoing as my invention I have signed my name, in presence of two witnesses, this 30th day of March, 1905.

FINLEY R. PORTER.

Witnesses:
FREDK. HAYNES,
ALIDA M. EGBERT.